United States Patent [19]
Schnitzer et al.

[11] Patent Number: 5,586,992
[45] Date of Patent: Dec. 24, 1996

[54] DYEING CELLULOSE-CONTAINING TEXTILE MATERIAL WITH HYDROGENATED INDIGO

[75] Inventors: Georg Schnitzer, Weisenheim; Franz Suetsch, Roedersheim-Gronau; Michael Schmitt, Worms; Erich Kromm, Weisenheim; Harald Schlueter, Weisenheim; Rudolf Krueger, Weisenheim; Andreas Weiper-Idelmann, Mannheim, all of Germany

[73] Assignee: BASF Aktiengesellschaft, Ludwigshafen, Germany

[21] Appl. No.: 525,655

[22] PCT Filed: Mar. 21, 1994

[86] PCT No.: PCT/EP94/00873

§ 371 Date: Sep. 29, 1995

§ 102(e) Date: Sep. 29, 1995

[87] PCT Pub. No.: WO94/23114

PCT Pub. Date: Oct. 13, 1994

[30] Foreign Application Priority Data

Mar. 30, 1993 [DE] Germany .......................... 43 10 122.4
May 12, 1993 [DE] Germany .......................... 43 15 873.0

[51] Int. Cl.$^6$ ................... D06P 1/22; D06P 5/20
[52] U.S. Cl. ........................ 8/653; 8/918; 8/444
[58] Field of Search ................ 8/444, 653, 651, 8/623, 604, 598, 918; 205/688

[56] References Cited

U.S. PATENT DOCUMENTS

| 2,044,790 | 7/1936 | Herz et al. .......................... 8/653 X |
| 4,166,717 | 9/1979 | Fono et al. .......................... 8/653 |

FOREIGN PATENT DOCUMENTS

| 4108240A1 | 3/1991 | Germany . |
| 4208757A1 | 3/1992 | Germany . |
| 4230870A1 | 9/1992 | Germany . |

OTHER PUBLICATIONS

CA: 74408 abstract of SU 334850 Dec. 1976, Rogokiv et al.

*Primary Examiner*—Margaret Einsmann
*Attorney, Agent, or Firm*—Oblon, Spivak, McClelland, Maier & Neustadt, P.C.

[57] ABSTRACT

A process for dyeing celluose-containing textile material with indigo comprises using an aqueous solution of leuco indigo prepared by catalytic hydrogenation and, after the leuco indigo has gone onto the textile material, converting it back into the pigment form in a conventional manner by air oxidation.

7 Claims, No Drawings

DYEING CELLULOSE-CONTAINING TEXTILE MATERIAL WITH HYDROGENATED INDIGO

The present invention relates to an improved process for dyeing cellulose-containing textile material with indigo.

BACKGROUND OF THE INVENTION

Indigo is a well-known vat dye used for dyeing cellulose-containing textile material, in particular cotton warp yarns for blue denim articles.

Indigo is water-insoluble, and to apply it it must first be reduced (vatted) into the water-soluble leuco form, which, having gone onto the material to be dyed, is oxidized back to the pigment.

In the customary dyeing processes, indigo is vatted in an alkali medium in a vessel upstream of the dyebath using inorganic reducing agents such as sodium dithionite and thiourea dioxide or else organic reducing agents such as hydroxyacetone. Additional machine-dependent portions of reducing agent are consumed during the dyeing process, since part of the leuco indigo is oxidized by air contact in the air passages and at the dyebath surface and has to be revatted, which is why the dyebath too has reducing agent added to it (up to 70% of the total required).

The disadvantage of vatting indigo with the reducing agents mentioned is the high concentration in the dyehouse waste water of sulfate (from about 3500 to 5000 mg/l, measured in the waste water of an indigo dyehouse) in the case of sodium dithionite or of oxygen-consuming substances (COD values about 8000 mg/l, measured in the waste water from an indigo dyehouse) in the case of hydroxyacetone. In addition to sodium dithionite, for example, the reduction requires a high level of alkali.

Also known are solid and pasty formulations of leuco indigo which in addition to alkali contain in particular sugar-derived polyhydroxy compounds, in particular molasses, as stabilizers intended to prevent oxidation to form indigo. When these formulations are used for dyeing, the sulfate content of the dyehouse waste water can indeed be effectively lowered, but the waste water becomes highly polluted with dissolved organic hydroxy compounds, measured as TOC (total organic carbon), COD (chemical oxygen demand) or BOD (biological oxygen demand); for example, a 60% by weight leuco indigo formulation with 25% by weight of molasses results in a COD of about 8000 mg/l. In addition, molasses diminishes the reducing effect of the reducing agent added to the dyebath (particularly sodium dithionite and thiourea dioxide) and interferes with the setting of the optimum dyeing pH, resulting in unsatisfactory results, inter alia a watery appearance and insufficient brilliance of the dyeing.

Finally, WO 90/15182 discloses a dyeing process wherein indigo is added to the dyebath in oxidized form and electrochemically reduced in the dyebath using mediators. Mediators are reversible redox systems which reduce the dye, being oxidized in the process, are rereduced at the cathode and are available again for dye reduction. However, reduction of the total amount of indigo necessary for dyeing requires enormous amounts of charge and large electrode surfaces. In addition, conducting salt has to be added to the dyeing solution in major quantities (about 1.5 g/l of NaOH, 30 g/l of $Na_2SO_4$) to ensure adequate electrical conductivity and hence to minimize the resistance losses and also the electrode surface area. This in turn leads to undesirably high levels of sulfate in the dyehouse waste water.

SUMMARY OF THE INVENTION

It is an object of the present invention to make it possible to dye with indigo without the aforementioned disadvantages and in an ecologically advantageous manner.

We have found that this object is achieved by a process for dyeing cellulose-containing textile material with indigo which comprises using an aqueous solution of leuco indigo prepared by catalytic hydrogenation and, after the leuco indigo has gone onto the textile material, converting it back into the pigment form in a conventional manner by air oxidation.

DETAILED DESCRIPTION OF THE PREFERRED EMBODIMENTS

The dyeing process of the invention advantageously employs aqueous leuco indigo solutions as obtained in the catalytic hydrogenation of indigo. Surprisingly, these solutions, in contra-distinction to alkaline solutions of indoxyl, the last intermediate stage in indigo synthesis, are stable under air-excluding conditions.

The leuco indigo solutions generally contain from 10 to 35, preferably from 10 to 25, particularly preferably from 15 to 20, % by weight of leuco indigo.

The alkali content, in particular the sodium hydroxide content, is generally from 2 to 10, preferably from 4 to 5, % by weight. If a higher alkali content is desired for a dyeing, it can be easily obtained by adding further alkali to the leuco indigo solution or to the dyebath.

The solubility of the leuco indigo in these solutions is distinctly higher than in the stock vats or makeup vats of conventional dyeing with indigo, which have to be laboriously made up by mixing water, pulverulent indigo, sodium hydroxide solution and sodium dithionite, and is generally >200 g/l compared with the 80 to 100 g/l of a stock vat. This reduces the volume that has to be added and makes it possible to prevent the overflowing of dyebaths.

The preparation of the leuco indigo solutions by catalytic hydrogenation of indigo can be effected in a generally known manner, in particular by reducing an alkaline indigo paste (customarily from 10 to 35% by weight of indigo, from 2 to 10% by weight of sodium hydroxide) using Raney nickel as catalyst at a hydrogen pressure from generally 2 to 4 bar and at a temperature from generally 60° to 90° C.

After subsequent clarification the leuco indigo solution obtained is advantageously introduced into tanks under air-excluding conditions and under an inert gas, preferably under a nitrogen pressure of about 0.1 bar. To diminish the danger of oxidation due to unwanted access of air, additionally from about 0.05 to 0.2% by weight of a reducing agent and/or of an oxygen-absorbing substance can be added. Suitable reducing agents for this purpose include for example sodium dithionite, thiourea dioxide, sulfinic acid derivatives and organic reducing agents as described in the earlier but as yet unpublished patent applications DE-A-42 08 757 and DE-A-42 30 870.

Of course, the indigo can also be reduced to leuco indigo by a method other than catalytic hydrogenation. Carbonyl ferrates as described in DE-A-41 08 240 are an example of reducing agents which can likewise be used.

The dyeing itself can be carried out in a manner customary for dyeing with indigo, the preference being for a continuous process.

However, there is no need to make up a stock vat; instead it is only necessary to meter the leuco indigo solution into the dyebath. Only during the dyeing process is there, as with the conventional process, a small need for additional reducing agent (eg. sodium dithionite) to reredce the indigo formed by air contact in the air passages and at the surface of the dyebath. However, the amount of hydrosulfite required for this purpose amounts to only a third to half the amount required in the conventional process.

After squeezing off and air oxidation the dyeing can then be finished in a conventional manner by washing and drying.

In a particular embodiment of the dyeing process of the invention, the proportion of leuco indigo oxidized during the dyeing by air contact in the air passages and at the dyebath surface is returned into the reduced form by electrochemical reduction in the presence of a mediator system.

The electrodes can be made of the commonly used materials such as stainless steel, titanium and lead, the preference being for example for copper.

The electrode potential is set sufficiently high for the evolution of hydrogen at the cathode to be avoided while, however, the regeneration of the mediator system is ensured, bearing in mind the electron transfer overvoltages.

Suitable mediators are reversible inorganic and organic redox systems whose redox potential is more cathodic than the potential of about −600 mV required for the reduction of indigo.

The working potential can advantageously be monitored and set via a reference electrode. In the case of copper electrodes it has an upper limit of about 1.1 V. The operating potential will therefore usually be from 600 to 1100 mV.

Examples of suitable organic mediators are quinonoid compounds such as anthraquinonesulfonic acids and hydroxyanthraquinones. The concentrations used are generally from $0.5 \times 10^{-3}$ to $3 \times 10^{-3}$, preferably about $1.5 \times 10^{-3}$, mol of organic mediator/l of dyebath.

Examples of suitable inorganic mediators are transition metal complex salts. Preference is here given to a system composed of iron(II/III)/triethanolamine/sodium hydroxide solution in the approximate weight ratio of 1:8:16 having a potential of up to about −980 mV. Customary concentrations range from 0.2 to 2, preferably from 0.4 to 0.8, g of $FeSO_4$/l of dyebath.

In this embodiment of the process of the invention it is particularly advantageous that, owing to the good electrical conductivity of the dyeing liquor on using the leuco indigo solution obtained by hydrogenation, it is possible to dispense with polluting additions of conducting salts such as sodium sulfate.

All that continues to be required are small amounts of sodium hydroxide solution to set the optimum dyeing pH.

The table below shows for comparison the electrical conductivities of a dyeing system (C) described in WO 90/15182 composed of 1.4 g/l of NaOH
a) 30 g/l of $Na_2SO_4$ b) 0 g/l of $Na_2SO_4$
4 g/l of triethanolamine
0.5 g/l of $FeSO_4 \times 7H_2O$
2 g/l of Brilliant Indigo and dyeing systems (Ia to f) according to the invention:
1.4 g/l of NaOH
4 g/l of triethanolamine
0.5 g/l of $FeSO_4 \times 7H_2O$
x g/l of leuco indigo sodium salt.

| Dyeing system | x g/l of leuco indigo Na salt | Conductivity [$mScm^{-1}$] |
|---|---|---|
| Ia | 3.9 | 10.0 |
| Ib | 7.7 | 11.7 |
| Ic | 11.3 | 13.2 |
| Id | 14.8 | 14.7 |
| Ie | 21.4 | 17.5 |
| If | 33.3 | 23.8 |
| Ca | — | 37.5 |
| Cb | — | 8.0 |

Even without the use of sodium sulfate as conducting salt the dyeing systems of the invention, in particular those having the preferred leuco indigo contents of from 7 to 35 g/l (particular preference being given to the range from 8 to 15 g/l), have adequate conductivities of >11 $mScm^{-1}$.

To convert the same amount of charge in a comparative dyeing system as described in WO 90/15182 without the addition of sodium sulfate would require up to three times the voltage or electrode surface area even though the current density would be lower. As a consequence, the energy requirements would be up to three times as high.

Owing to the use of the prereduced indigo only the leuco indigo which has been oxidized by air contact during the dyeing process has to be reredced. Since the degree of air contact is determined by the dyeing machine used, machines with small dyebath surface areas, a minimal number of squeeze rolls and short air passages are preferred.

Particular preference is given to full-width dyeing machines (slashers) which accommodate a yarn sheet of about 4000 ends (metriccount 12) uniformly distributed over the working width.

Particularly suitable among these is a Loopdye® (from Looptex, Lugano, CH) which has only one dyeing trough—moreover, of low bath volume—and only one pair of squeeze rolls.

To reduce the indigo formed by air contact a Loopdye will usually require a makeup quantity of 40 g of 90% strength sodium dithionite per minute (yarn throughput 13 kg/min, indigo level 2%), while a slasher of customary bath volume will usually require about 80 g of 90% strength sodium dithionite/min.

Following conversion into electrochemical equivalents, the use of prereduced indigo requires a current total of 821 A in the case of the Loopdye and of 1334 A in the case of the slasher. If, however, the indigo used has not been prereduced, even a Loopdye will require 5130 A for the dyeing process.

This embodiment of the dyeing process of the invention comprises passing the dyeing liquor through a continuous flow electrolytic cell which may be divided into a plurality of subsidiary cells whose cathode and anode spaces are each separated by a membrane and whose electrodes can be connected monopolarly or in series. The electrode area has to be such that, at maximum current density and a working potential below the $H_2$ evolution potential, sufficient electrochemical reduction equivalents are available for regenerating the leuco indigo.

The dyeing process of the invention produces brilliant dyeings, comparable with conventional indigo dyeings, in an enviromentally distinctly more benign manner. The fact that less sodium dithionite is required results in a low level of sulfate in the waste water, at about 1500 mg/l, and a correspondingly lower consumption of sodium hydroxide. There is no water pollution due to oxidizable organic substances as with the use of molasses-stabilized leuco indigo formulations. A further technical advantage is more production flexibility, since, in contradistinction to using unvatted indigo, no stock vat specific to the specific article and the amount to be dyed has to be prepared. On the contrary, a plurality of dyeing machines producing different programs can be supplied with leuco indigo solution from a reservoir tank at the same time.

A further lowering in the sulfate level of the dyehouse waste water can be achieved by means of the particular embodiment of the dyeing process according to the invention in which the proportion of the leuco indigo which is being reoxidized by air contact during the dyeing process is reduced not with a reducing agent such as sodium dithionite but electrochemically using a mediator system. Any pollutants in the waste water can in this case only come from the mediator system, which in any event is only used in small amounts.

EXAMPLES

Example 1

Continuous dyeing in a full-width dyeing machine
Yarn: Cotton
Yarn linear density: Metric count 12 (12 km/kg of yarn)
Number of ends: 4080
Speed: 35 m/min
Indigo used: 2% (on weight of yarn)
Yarn throughput: 11.7 kg/min
Length of lot: 23 000 m
Dyebath volume: 1500 l The dyebath (1500 l; 7 g/l of leuco indigo) was made up by mixing 1200 l of water, 3 l of 38° Bé sodium hydroxide solution, 3 kg of sodium dithionite (about 90% strength) and 52.5 kg of 20% strength by weight aqueous leuco indigo solution having a sodium hydroxide content of 4.8% by weight.

During dyeing, leuco indigo, sodium hydroxide and hydrosulfite were replenished at their rates of consumption.

After dyeing the yarn was rinsed and further treated in a conventional manner.

Hue, fastness properties and appearance after the made-up articles had been washed were up to standard.

A rinse water consumption of 3000 l/h led to a sulfate concentration of 1.5 g/l in the waste water.

Comparative Example 1A

The dyeing was carried out similarly to Example 1 using pulverulent indigo (99% strength by weight).

And 1000 l of makeup vat were prepared as follows:

650 l of water, 1 kg of a commercial dispersant (dissolved in 10 l of hot water), 68 kg of indigo and 100 l of 38° Bé sodium hydroxide solution were mixed with stirring. After bulking with water to 900 l, 67 kg of sodium dithionite (about 90% strength) were added over 10 min. After bulking with water to 1000 l, vatting took place at room temperature for 3.5 h.

The dyebath was made up as in Example 1 but with the addition of 154 l of the makeup vat.

A similar dyeing was obtained, but the sulfate concentration of the waste water was 5.2 g/l.

Comparative Example 1B

The dyeing was carried out similarly to Example 1 using a molasses-stabilized 60% strength by weight leuco indigo formulation (25% by weight of molasses, 15% by weight of sodium hydroxide).

The dyebath (1500 l) was made up by mixing 1200 l of water, 2 l of 38° Bé sodium hydroxide solution, 3 kg of sodium dithionite (about 90% strength) and 17.5 kg of the leuco indigo formulation.

1000 l of makeup vat were prepared using 114 kg of the leuco indigo formulation and 72 l of 38° Bé sodium hydroxide solution.

The redox potential in the dyebath was −620 mV compared with the −780 mV of the conventional process (Comparative Example 1A).

The result was not up to standard; after washing, the made-up articles had a watery appearance.

The COD of the waste water was 8000 mg/l.

Example 2

Continuous dyeing in a tow dyeing machine
Yarn: Cotton
Yarn linear density: Metric count 12 (12 km/kg of yarn)
Number of ends: 8160 (24 tows of 340 ends each)
Speed: 25 m/min
Indigo used: 2% (on weight of yarn)
Yarn throughput: 17 kg/min
Length of lot: 12 000 m
Dyebath volume: 24 000 l The dyebath (24 000 l; 2 g/l of leuco indigo) was made up by mixing 20 000 l of water, 36 l of 38° Bé sodium hydroxide solution, 36 kg of sodium dithionite (about 90% strength) and 240 kg of the leuco indigo solution of Example 1.

During dyeing, leuco indigo, sodium hydroxide and hydrosulfite were replenished at their rates of consumption.

After dyeing the yarn was rinsed and further treated in a conventional manner.

Hue, fastness properties and appearance after the made-up articles had been washed were up to standard.

A rinse water consumption of 9000 l/h led to a sulfate concentration of 1.6 g/l in the wastewater.

Comparative Example 2A

The dyeing was carried out similarly to Example 2 using the pulverulent indigo of Example 1A.

2000 l of makeup vat were made up similarly to Example 1A using 2 kg of a commercial dispersant, 134 kg of indigo, 244 l of 38° Bé sodium hydroxide solution and 180 kg of sodium dithionite (about 90% strength).

The dyebath was made up as in Example 2 but with the addition of 716 l of the makeup vat.

A similar dyeing was obtained, but the sulfate concentration of the waste water was 3.4 g/l.

We claim:

1. A process for dyeing cellulose-containing textile material with indigo which comprises a) introducing into a dyebath an aqueous solution of leuco indigo prepared by catalytic hydrogenation;

b) contacting the textile material with the dyebath; and, after the leuco indigo has gone onto the textile material, c) converting said leuco indigo back into the pigment form in a conventional manner by air oxidation.

2. A process as claimed in claim 1 wherein the leuco indigo solution contains from 10 to 35% by weight of leuco indigo.

3. A process as claimed in claim 1 wherein the leuco indigo solution contains from 2 to 10% by weight of alkali.

4. A process as claimed in claim 1 wherein the leuco indigo solution contains from 2 to 10% by weight of sodium hydroxide.

5. A process for dyeing cellulose-containing textile material with indigo which comprises using an aqueous solution of leuco indigo prepared by catalytic hydrogenation and, after the leuco indigo has gone onto the textile material, converting the leuco indigo back into the pigment form by air oxidation, wherein the leuco indigo oxidized during dyeing by air contact is electrochemically reduced in the dyeing liquor using a mediator system.

6. A process as claimed in claim 5 wherein the mediator used is a transition metal complex.

7. A process as claimed in claim 5 wherein the mediator used is an organic redox system which is substantially reversible under the dyeing conditions.

* * * * *

(12) EX PARTE REEXAMINATION CERTIFICATE (6575th)
United States Patent
Schnitzer et al.

(10) Number: US 5,586,992 C1
(45) Certificate Issued: Dec. 23, 2008

(54) DYEING CELLULOSE-CONTAINING TEXTILE MATERIAL WITH HYDROGENATED INDIGO

(75) Inventors: Georg Schnitzer, Weisenheim (DE); Franz Suetsch, Roedersheim-Gronau (DE); Michael Schmitt, Worms (DE); Erich Kromm, Weisenheim (DE); Harald Schlueter, Weisenheim (DE); Rudolf Krueger, Weisenheim (DE); Andreas Weiper-Idelmann, Mannheim (DE)

(73) Assignee: Dystar Textilfarben GmbH & Co., Frankfurt (DE)

Reexamination Request:
No. 90/007,956, Feb. 28, 2006

Reexamination Certificate for:
Patent No.: 5,586,992
Issued: Dec. 24, 1996
Appl. No.: 08/525,655
Filed: Sep. 29, 1995

(22) PCT Filed: Mar. 21, 1994
(86) PCT No.: PCT/EP94/00873
§ 371 (c)(1),
(2), (4) Date: Sep. 29, 1995
(87) PCT Pub. No.: WO94/23114
PCT Pub. Date: Oct. 13, 1994

(30) Foreign Application Priority Data
Mar. 30, 1993 (DE) ............................................. 4310122
May 12, 1993 (DE) ............................................. 4315873

(51) Int. Cl.
*C09B 7/00* (2006.01)
*C09B 7/02* (2006.01)
*D06P 5/20* (2006.01)
*D06P 1/00* (2006.01)
*D06P 1/22* (2006.01)

(52) U.S. Cl. ..................................... 8/653; 8/918; 8/444
(58) Field of Classification Search ........................ None
See application file for complete search history.

(56) References Cited

U.S. PATENT DOCUMENTS

| | | | |
|---|---|---|---|
| 794,049 A | 7/1905 | Seidel et al. | |
| 820,900 A | 5/1906 | Wimmer | |
| 833,654 A | 10/1906 | Wimmer | |
| 885,978 A | 4/1908 | Chaumat | |
| 1,247,927 A | 11/1917 | Brochet | |
| 4,283,198 A * | 8/1981 | Fletcher | 8/653 |
| 5,112,987 A * | 5/1992 | Yamamoto et al. | 548/457 |
| 5,611,822 A | 3/1997 | Gurley | |
| 6,905,524 B2 | 6/2005 | Hartgrove et al. | |

OTHER PUBLICATIONS

A book published by John Wiley & Sons, Inc., London, Feb. 1920, by J. Merritt Mathews, Ph.D., entitled Application of Dyestuffs to Textiles, Paper, Leather and Other Materials.
A book published by Scott, Greenwood & Son, London, Second Revised Edition, 1917, pp. 187–267 by Franklin Beech, entitled The Dyeing of Cotton Fabrics A Practical Handbook for the Dyer and Student.
A book published by Charles Griffin & Company Ltd., London, Second Edition, 1946, pp. 448–536 by S.R. Trotman and E.R. Trotman, entitled The Bleaching, Dyeing, and Chemical Technology of Textile Fibres.
A book published by Griffin, London, Third Edition, 1964, pp. 440–441, 452–453 by E.R. Trotman entitled Dyeing and Chemical Technology of Textile Fibres.
A book published by John Wiley & Sons, Inc., New York, 1947, pp. 78–91 by M.R. Fox entitled Vat Dyestuffs and Vat Dyeing.
A book entitled Indigo Pure B.A.S.F. by Badische Anilin– & Soda–Fabrik Ludwigshafen °/Rhine.
A book entitled Pocket Guide to the Application in Textile Dyeing of the Dyestuffs of the I.G. Farbenindustri Aktiengesellschaft Badisch Anilin– & Soda–Fabrik, 1922.
A book published by Charles Griffin & Company Ltd., London, 1933, pp. 183–208, 400–472 by Jocelyn Field Thorpe et al. entitled The Synthetic Dyestuffs and the Intermediate Products from Which They are Derived.
A book published by The Society of Chemical Industry in Basle, 1936, pp. 293–500, entitled The Dyestuff of the Society of Chemical Industry in Basle and their Application (vol. I: Cotton and Other Vegetable Fibres), $3^{rd}$ Edition.
A book published by General Dyestuff Corporation, New York, 1936, pp. 1–18, 158–676, entitled Manual for Dyeing and Other Vegetable Fibres.
Ullmanns Encyclopedia of Technical Chemistry, $4^{th}$ Edition, vol. 13, Hormones to Ceramics, published by Chemie Weinheim, New York, 1977, pp. 177–179 (with translation).
Ullmanns Encyclopedia of Technical Chemistry, $3^{rd}$ Edition, vol. 8, Antifreeze to Iridium published by Urban & Schwarzenberg, Munchen, Berlin, 1957, pp. 749–750 (with translation).
A report published by British Intelligence Objectives Sub–Committee, London, Sep. and Oct. 1946, pp. 1, 15–22, reported by K.A.J. Chamberlain et al. entitled The Manufacture of Miscellaneous Dyestuffs (Indigoid, Dioxazine, Auramine, Etc.), B.I.O.S. Trip 2351.

* cited by examiner

Primary Examiner—Stephen Stein

(57) ABSTRACT

A process for dyeing celluose-containing textile material with indigo comprises using an aqueous solution of leuco indigo prepared by catalytic hydrogenation and, after the leuco indigo has gone onto the textile material, converting it back into the pigment form in a conventional manner by air oxidation.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5–7 is confirmed.

Claim 1 is cancelled.

Claims 2–4 are determined to be patentable as amended.

New claims 8–22 are added and determined to be patentable.

2. A process as claimed in claim [1] *11* wherein the leuco indigo solution contains from 10 to 35% by weight of leuco indigo.

3. A process as claimed in claim [1] *11* wherein the leuco indigo solution contains from 2 to 10% by weight of alkali.

4. A process as claimed in claim [1] *11* wherein the leuco indigo solution contains from 2 to 10% by weight of sodium hydroxide.

*8. A process for dyeing cellulose-containing textile material with indigo which comprises*
   *a) introducing directly into a dyebath an aqueous solution of leuco indigo, said aqueous solution prepared by catalytic hydrogenation using Raney nickel catalyst;*
   *b) contacting the textile material with the dyebath; and, after the leuco indigo has gone onto the textile material,*
   *c) converting said leuco indigo back into the pigment form in a conventional manner by air oxidation.*

*9. A process for dyeing cellulose-containing textile material with indigo which comprises*
   *a) introducing directly into a dyebath from a reservoir tank an aqueous solution of leuco indigo, said aqueous solution prepared by catalytic hydrogenation;*
   *b) contacting the textile material with the dyebath; and, after the leuco indigo has gone onto the textile material,*
   *c) converting said leuco indigo back into the pigment form in a conventional manner by air oxidation.*

*10. A process as claimed in claim 9, wherein the aqueous solution of leuco indigo is stored in said reservoir tank under air exclusion conditions and under an inert gas atmosphere.*

*11. A process as claimed in claim 9, wherein the aqueous solution of leuco indigo is stored in said reservoir tank under a nitrogen atmosphere.*

*12. A process for dyeing cellulose-containing textile material with indigo which comprises*
   *a) introducing, under air exclusion conditions, directly into a dyebath an aqueous solution of leuco indigo, said aqueous solution prepared by catalytic hydrogenation;*
   *b) contacting the textile material with the dyebath; and, after the leuco indigo has gone onto the textile material,*
   *c) converting said leuco indigo back into the pigment form in a conventional manner by air oxidation.*

*13. A process as claimed in claim 12 wherein said air exclusion conditions comprise the use of a nitrogen atmosphere.*

*14. A process for dyeing cellulose-containing textile material with indigo which comprises*
   *a) introducing directly into a dyebath an aqueous solution of leuco indigo, said aqueous solution prepared by catalytic hydrogenation;*
   *b) contacting the textile material with the dyebath; and, after the leuco indigo has gone onto the textile material,*
   *c) converting said leuco indigo back into the pigment form in a conventional manner by air oxidation,*
   *wherein said process is continuous.*

*15. A process for dyeing cellulose-containing textile material with indigo which comprises*
   *a) introducing directly into a dyebath an aqueous solution of leuco indigo, wherein the solubility of the leuco indigo in the aqueous solution of leuco indigo is > 200 g/l, said aqueous solution prepared by catalytic hydrogenation;*
   *b) contacting the textile material with the dyebath; and, after the leuco indigo has gone onto the textile material,*
   *c) converting said leuco indigo back into the pigment form in a conventional manner by air oxidation.*

*16. A process for dyeing cellulose-containing textile material with indigo which comprises*
   *a) introducing directly into a dyebath, in a volume that avoids overflowing of the dyebath, an aqueous solution of leuco indigo, said aqueous solution prepared by catalytic hydrogenation;*
   *b) contacting the textile material with the dyebath; and, after the leuco indigo has gone onto the textile material,*
   *c) converting said leuco indigo back into the pigment form in a conventional manner by air oxidation.*

*17. A process for dyeing cellulose-containing textile material with indigo which comprises*
   *a) introducing into a dyebath an aqueous solution of leuco indigo prepared by catalytic hydrogenation containing from 2 to 10% by weight of alkali from 10 to 35% by weight of leuco indigo;*
   *b) contacting the textile material with the dyebath; and, after the leuco indigo has gone onto the textile material,*
   *c) converting said leuco indigo back into the pigment form in a conventional manner by air oxidation.*

*18. A process for dyeing cellulose-containing textile material with indigo which comprises*
   *a) introducing into a dyebath an aqueous solution of leuco indigo prepared by catalytic hydrogenation containing from 2 to 10% by weight of alkali;*
   *b) contacting the textile material with the dyebath; and, after the leuco indigo has gone onto the textile material,*
   *c) converting said leuco indigo back into the pigment form in a conventional manner by air oxidation,*
   *wherein said process is continuous.*

19. A process for dyeing cellulose-containing textile material with indigo which comprises
   a) introducing into a dyebath an aqueous solution of leuco indigo prepared by catalytic hydrogenation containing from 2 to 10% by weight of alkali and wherein the solubility of the leuco indigo in the aqueous solution of leuco indigo is > 200 g/l;
   b) contacting the textile material with the dyebath; and, after the leuco indigo has gone onto the textile material,
   c) converting said leuco indigo back into the pigment form in a conventional manner by air oxidation.

20. A process for dyeing cellulose-containing textile material with indigo which comprises
   a) introducing into a dyebath, in a volume that avoids overflowing of the dyebath, an aqueous solution of leuco indigo prepared by catalytic hydrogenation containing from 2 to 10% by weight of alkali;
   b) contacting the textile material with the dyebath; and, after the leuco indigo has gone onto the textile material,
   c) converting said leuco indigo back into the pigment form in a conventional manner by air oxidation.

21. A process for dyeing cellulose-containing textile material with indigo which comprises
   a) introducing directly into a dyebath an aqueous solution of leuco indigo prepared by catalytic hydrogenation containing from 2 to 10% by weight of alkali;
   b) contacting the textile material with the dyebath; and, after the leuco indigo has gone onto the textile material,
   c) converting said leuco indigo back into the pigment form in a conventional manner by air oxidation.

22. A process for dyeing cellulose-containing textile material with indigo which comprises
   a) introducing directly into a dyebath from a reservoir tank an aqueous solution of leuco indigo prepared by catalytic hydrogenation containing from 2 to 10% by weight of alkali and wherein the solubility of the leuco indigo in the aqueous solution of leuco indigo is > 200 g/l;
   b) contacting the textile material with the dyebath; and, after the leuco indigo has gone onto the textile material,
   c) converting said leuco indigo back into the pigment form in a conventional manner by air oxidation.

* * * * *